United States Patent [19]

Noble et al.

[11] Patent Number: 5,156,359
[45] Date of Patent: Oct. 20, 1992

[54] HANDLE ASSEMBLY FOR AN AIRCRAFT DOOR OR THE LIKE

[75] Inventors: Donald R. Noble, Issaquah; Kurt Poechlauer, Everett; Richard J. Ulman, Bellevue, all of Wash.

[73] Assignee: The Boeing Company, Seattle, Wash.

[21] Appl. No.: 715,413

[22] Filed: Jun. 13, 1991

[51] Int. Cl.$^5$ .............................................. B64B 1/14
[52] U.S. Cl. .................................. 244/129.4; 70/208; 292/336.3; 292/347; 292/DIG. 31
[58] Field of Search ............... 244/129.5, 129.4, 118.5, 244/905, 137.2; 292/336.3, 347, DIG. 31; 70/208

[56] References Cited

U.S. PATENT DOCUMENTS

| | | | |
|---|---|---|---|
| 1,972,626 | 9/1934 | Jones et al. | 70/208 |
| 2,019,429 | 10/1935 | McCormick | 70/208 |
| 2,260,785 | 10/1941 | Miguel | 70/208 |
| 2,349,192 | 5/1944 | Oxhandler | 70/208 |
| 2,357,049 | 8/1944 | Leonard | 70/208 |
| 2,833,582 | 5/1958 | Henrichs . | |
| 3,111,833 | 11/1963 | Dettmer | 70/208 |
| 3,633,853 | 1/1972 | Collins | 182/48 |
| 3,852,854 | 12/1974 | Sigrud et al. | 244/137.2 |
| 4,106,729 | 8/1978 | Bergman et al. | 244/137 P |
| 4,125,235 | 11/1978 | Fitzgerald et al. | 244/129.5 |
| 4,470,566 | 9/1984 | Fitzgerald | 244/129.5 |
| 4,487,440 | 12/1984 | Beijer | 292/DIG. 31 |
| 4,512,539 | 4/1985 | Ackermann et al. | 244/137.2 |
| 4,715,562 | 12/1987 | Bokalot | 244/137.2 |
| 4,720,065 | 1/1988 | Hamatani | 244/129.5 |
| 4,898,408 | 2/1990 | Hauber | 292/DIG. 31 |

Primary Examiner—Galen Barefoot
Attorney, Agent, or Firm—Christensen, O'Connor, Johnson & Kindness

[57] ABSTRACT

A handle assembly for controlling an aircraft door latch mechanism so that the door can be opened or closed from either inside or outside the aircraft. The assembly includes an inner shaft that is connected to the latch mechanism so as to control the opening and closing of the door, and an outer shaft that overlaps the inner shaft and that can be telescopically extended away from inner shaft. An inside handle is attached to the inner shaft so as to rotate the shaft. Rotation of the outer shaft is controlled by an outside handle attached thereto. An inner clutch half is attached, by splines, to the inboard end of the outer shaft. An outer clutch half is attached, by splines, to the outboard end of the inner shaft. The clutch halves are normally spaced away from each other. When the outside handle and the outer shaft are extended, the clutch halves interlock so that the shafts will rotate in unison. An actuator disarming assembly with a translating pivoting crank is attached to the outer shaft. When the outside handle and the outer shaft are extended, the crank pivots to cause the disarming mechanism to disarm any actuator that may be attached to the door. This prevents inadvertent triggering of the actuator when persons outside the aricraft are trying to open the door.

36 Claims, 9 Drawing Sheets

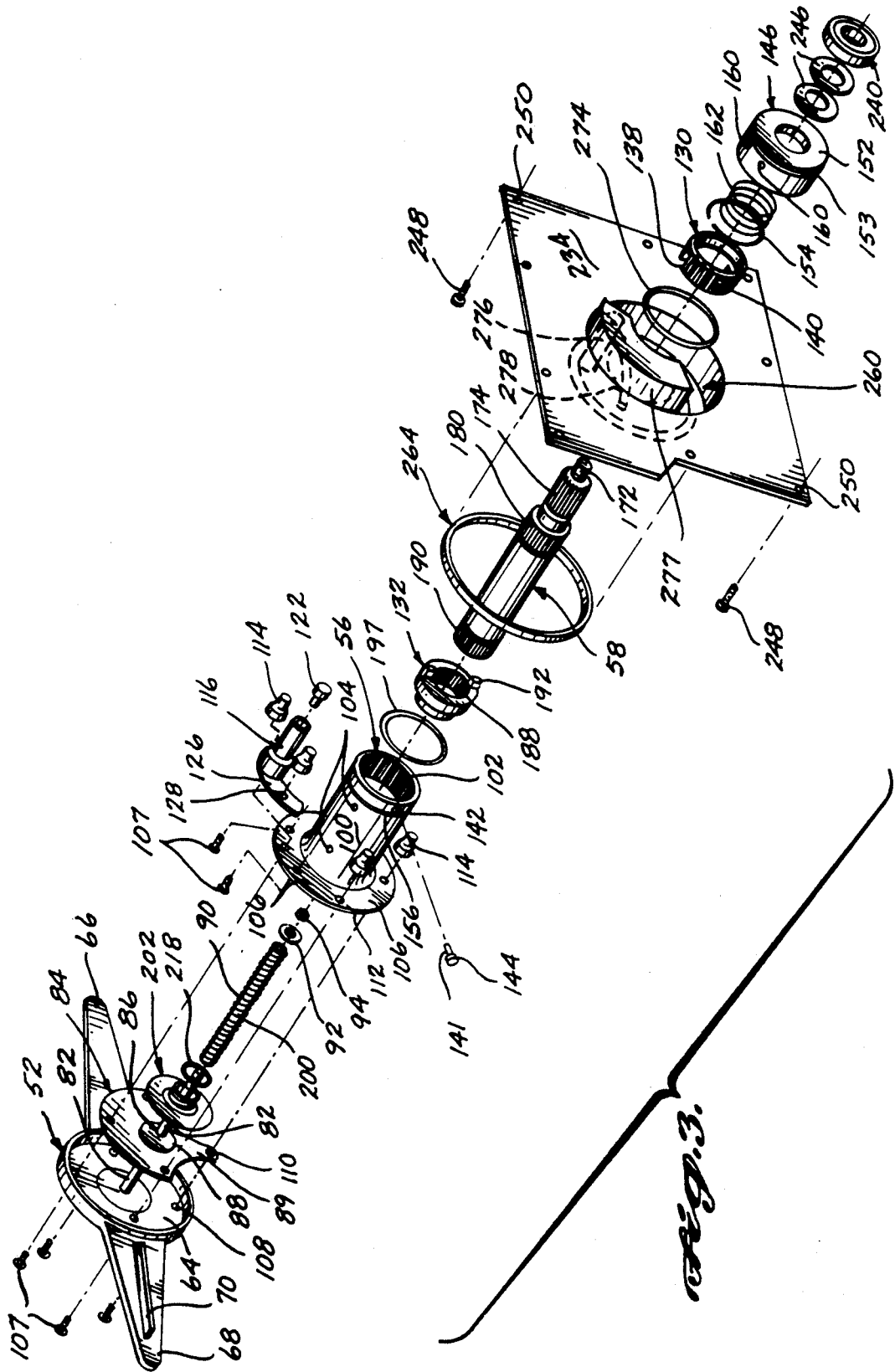

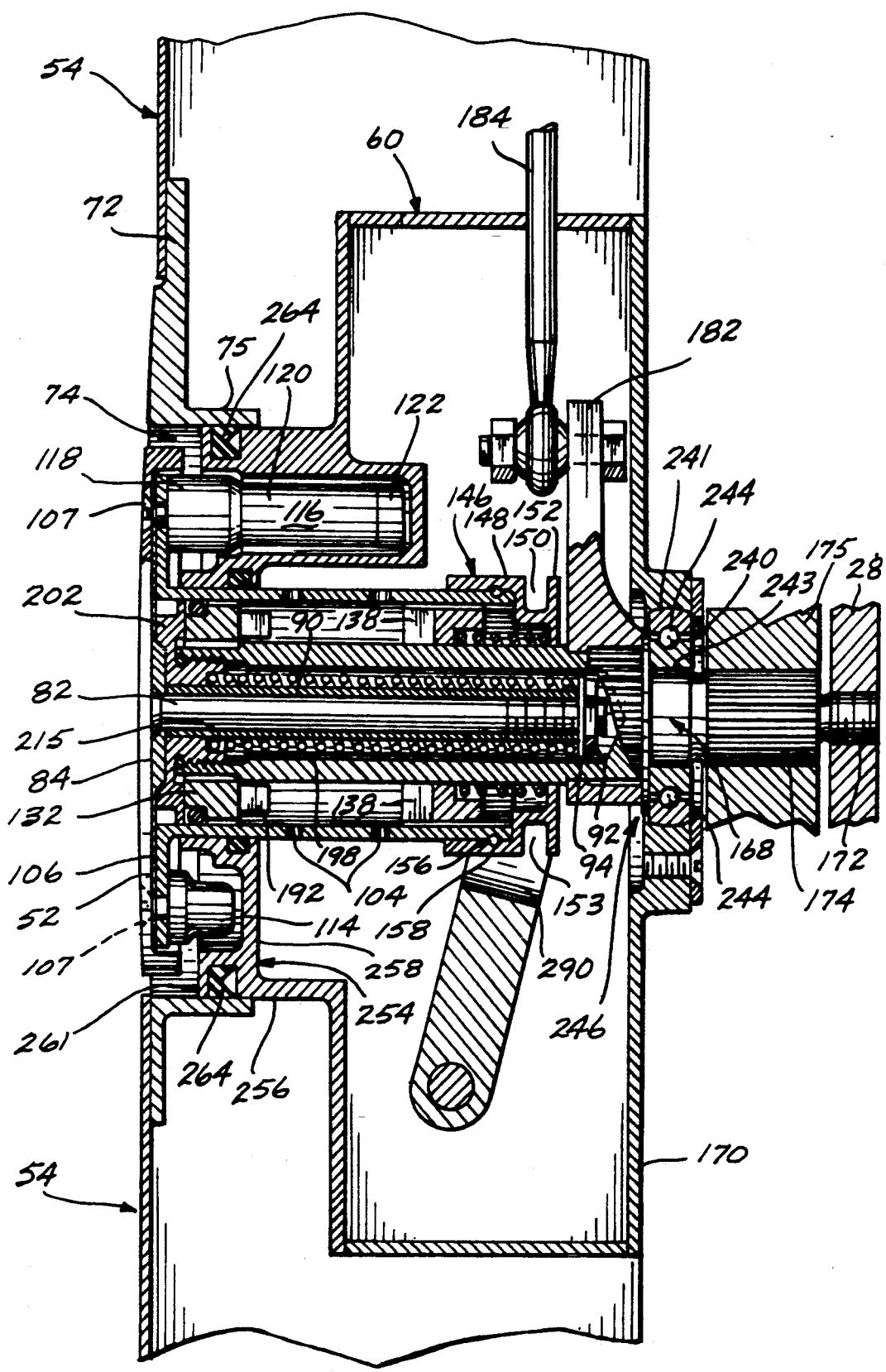

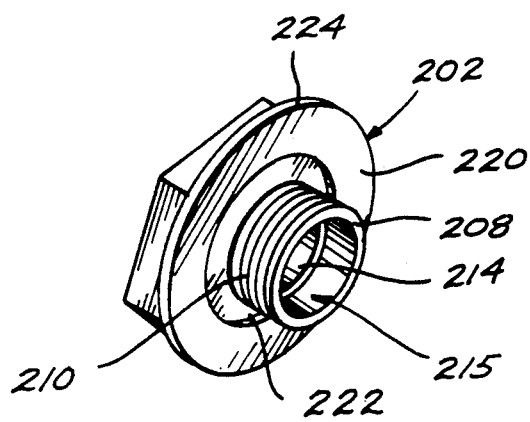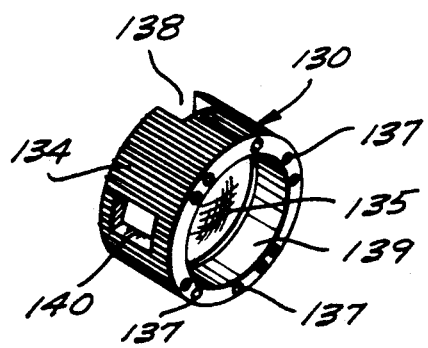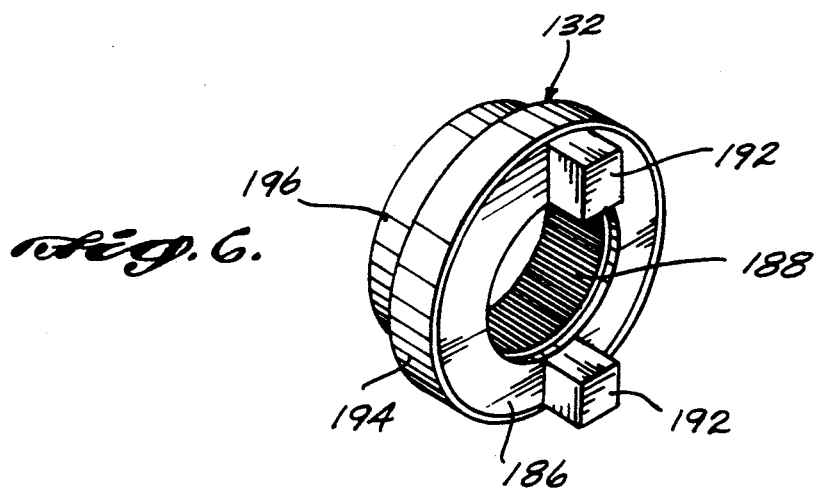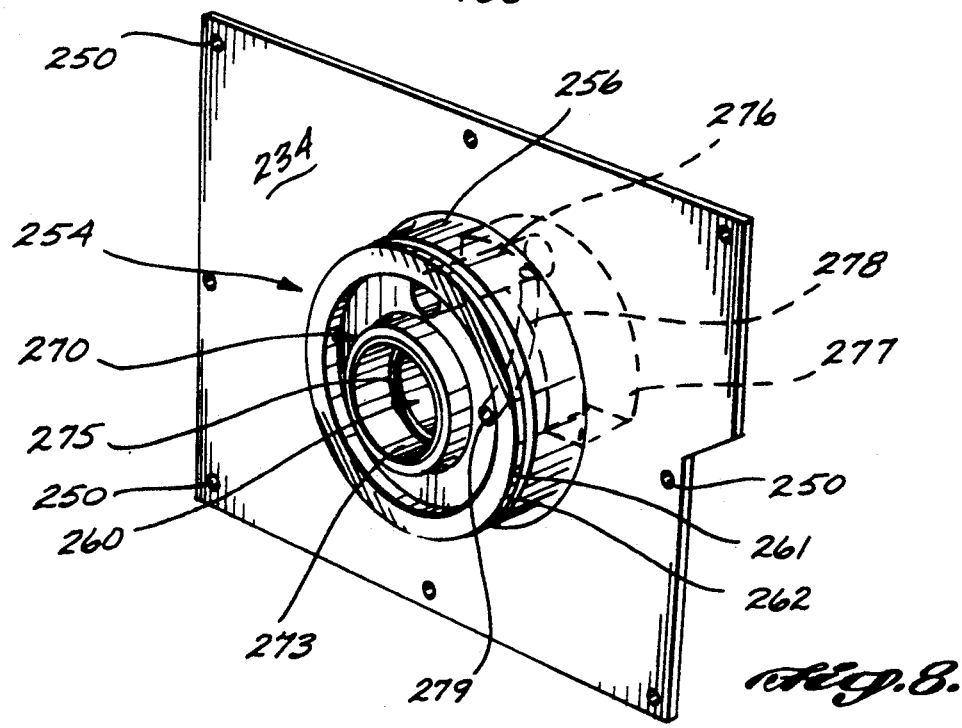

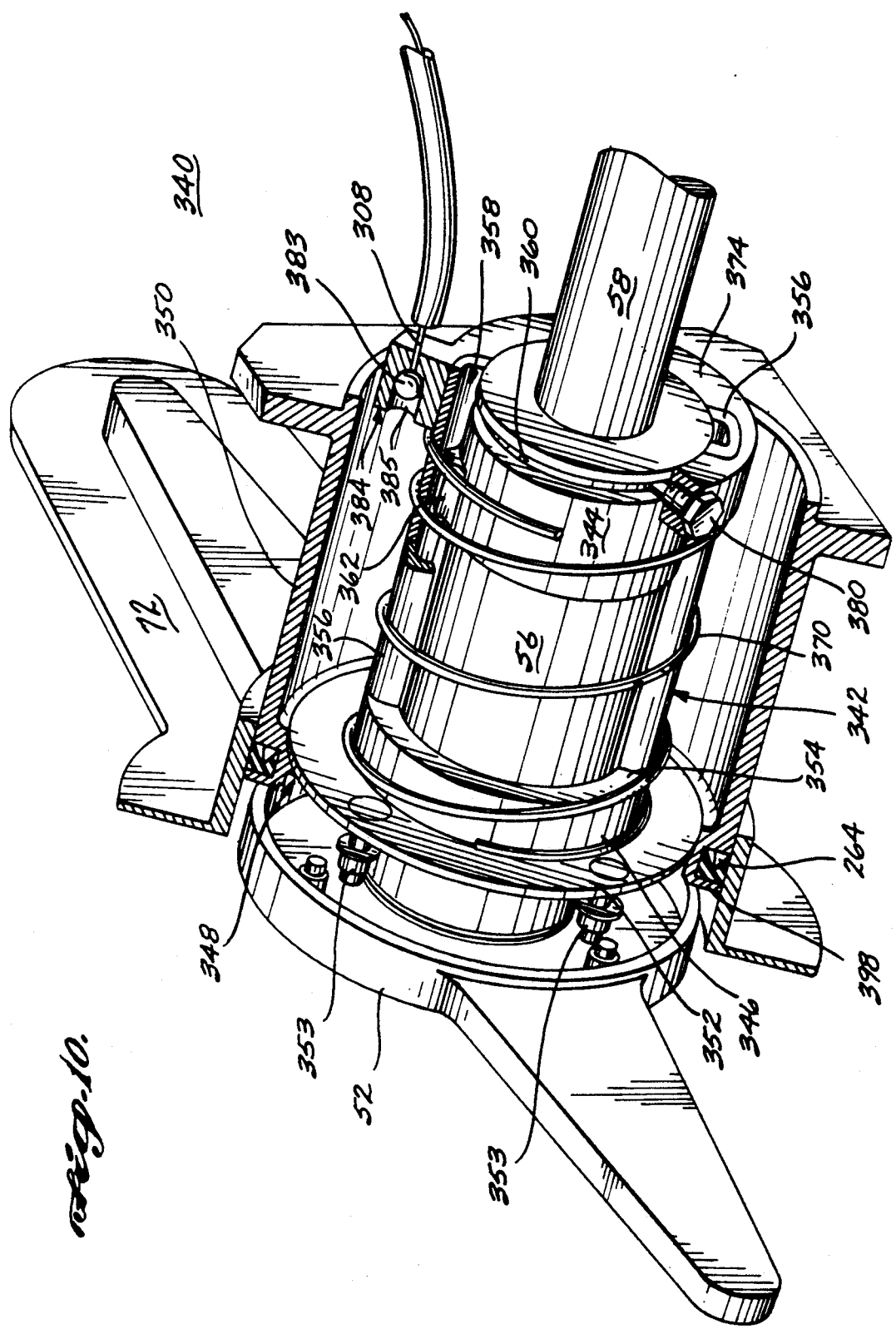

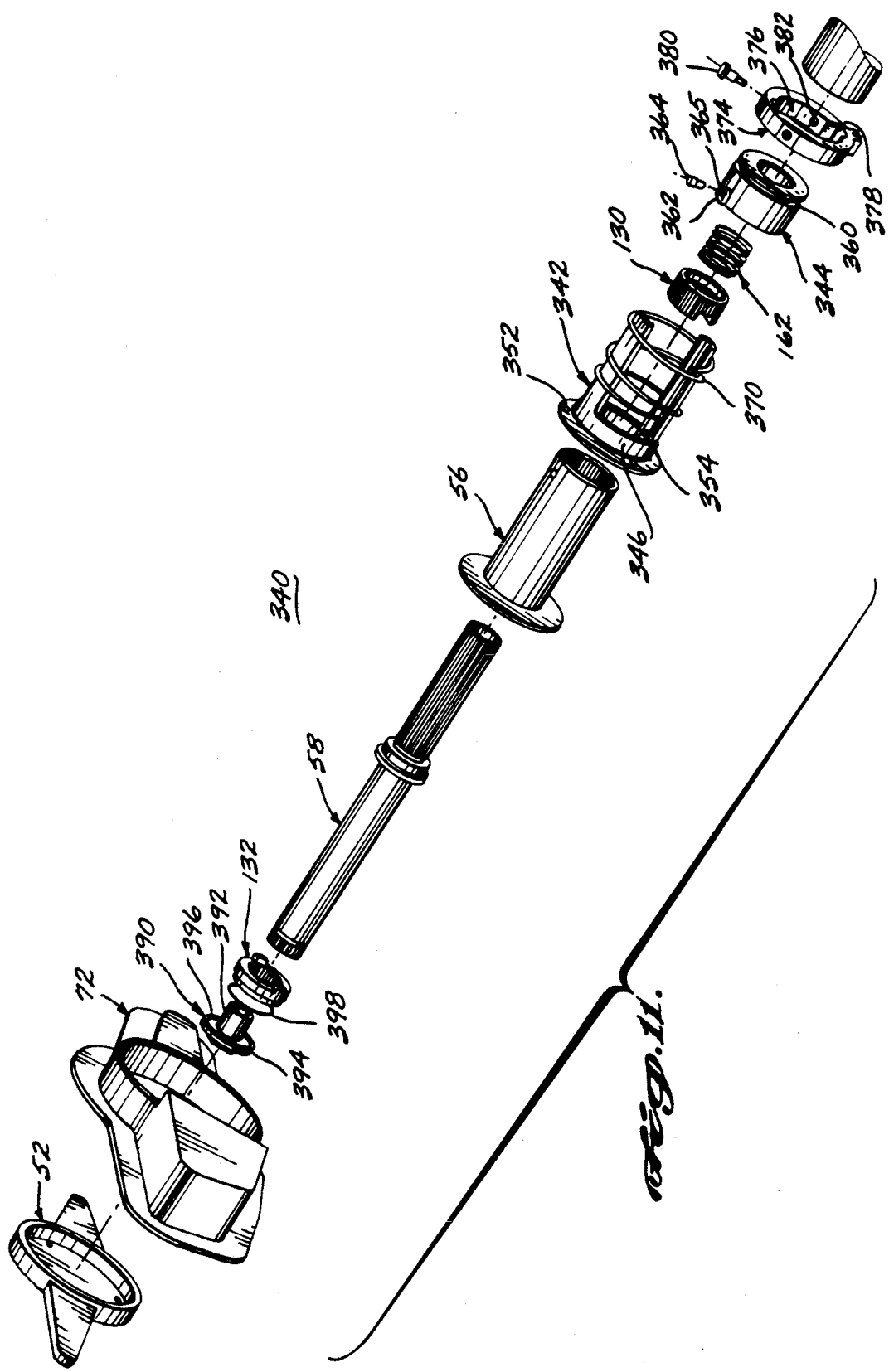

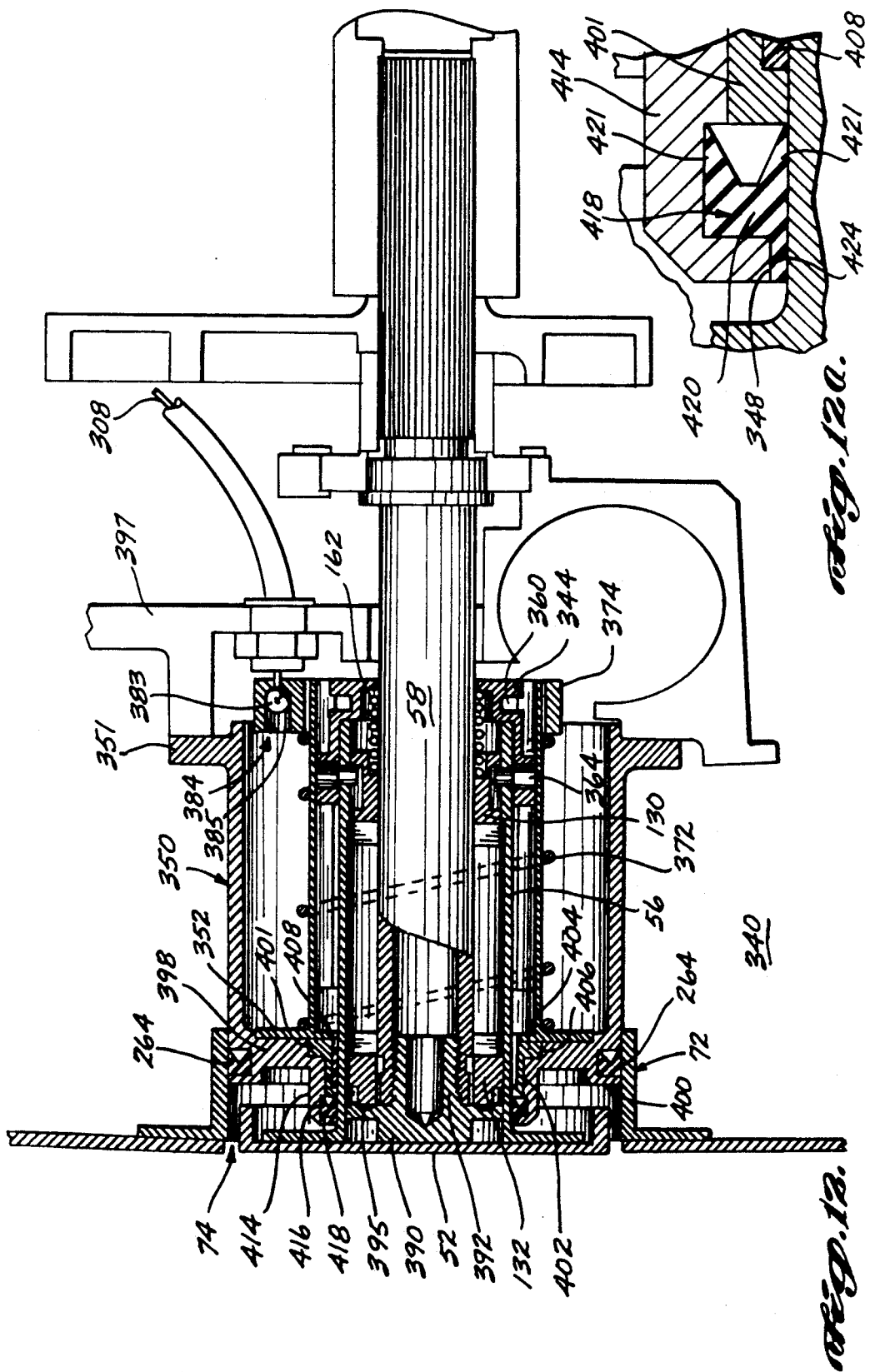

1

HANDLE ASSEMBLY FOR AN AIRCRAFT DOOR OR THE LIKE

FIELD OF THE INVENTION

This invention relates to aircraft door assemblies and, more particularly, to a handle assembly for controlling the opening and closing of an aircraft door.

BACKGROUND OF THE INVENTION

An integral part of an aircraft fuselage is the door assembly through which passengers and crew enter and exit the aircraft. The door assemblies of modern commercial aircraft include latch mechanisms that lock the door in place when it is closed and unlock the door when it is opened. The actual opening and closing of the door assemblies are controlled by handle assemblies that actuate the latch mechanisms. Most of the handle assemblies are provided with interior and exterior handles so that the door assemblies in which they are installed may be opened or closed from either inside or outside the aircraft. Many of these door assemblies also include emergency escape slides and actuators that, when triggered, rapidly open the associated doors. Often, the emergency escape slide is arranged to be deployed in conjunction with the opening of the door by the associated actuator. When the actuator is triggered, the actuator will rapidly open the door and the escape slide will automatically inflate so as to facilitate rapid evacuation of the aircraft.

An aircraft door handle assembly is typically designed to perform a number of different functions and to operate properly regardless of the harshness of the environmental conditions to which it may be exposed. Most handle assemblies are constructed so that either the interior or exterior handle can be used to actuate the latching mechanism regardless of which handle was last used to actuate the mechanism. This is because when an aircraft door is closed prior to takeoff, it is impossible to know if upon landing, persons inside or outside the aircraft will want or need to open the door first. A handle assembly employed with an aircraft door assembly that includes an emergency actuator must be capable of deactivating the actuators from outside the aircraft. This is important, because with the door in an emergency mode, when the actuator is armed, persons inside and outside the aircraft may reach the door essentially simultaneously. If the actuator is triggered while someone is outside the aircraft, the door may rapidly open and automatically deploy the escape slide, either of which could then strike that individual. Thus, persons outside the aircraft need to be able to disarm the actuator so that they can open the aircraft door without risk of injury.

The typical handle assembly includes an exterior, or outside handle that is normally stored flush with the outer skin of the aircraft so as to not degrade the aerodynamic efficiencies of the fuselage. Regardless of the large pressure differentials that may develop between the inside of the aircraft, which is pressurized, and the outside low ambient pressure at high altitudes, the handle assembly must keep the outside handle locked in place so that it does not "pop out" in flight. Inadvertent extension of the outside handle can disrupt the airflow around the aircraft and degrade aerodynamic performance. Moreover, extension of the outside handle could lead to its movement so as to cause self-actuation of the handle assembly and the associated latch mechanism. With an unpressurized cabin this could result in the door inadvertently opening while the aircraft is in flight. Moreover, a handle assembly must also be designed to operate even though its exterior components may be exposed to significant amounts of rain or snow.

Aircraft door handle assemblies have been provided that meet one or more of these design criteria. These assemblies are often provided with secondary latch mechanisms. For example, some aircraft door handle assemblies are provided with latches that lock the outside handle in position and/or disarm the emergency actuator. Manipulation of these handle latches can lengthen the time needed to actuate the handles with which they are used. Some aircraft door handle assemblies are constructed so that they are integrally connected to the doors in which they are employed. In the event the handle assembly requires extensive maintenance, the assembly cannot be simply replaced; the whole of the aircraft must be taken out of service. Moreover, it has typically been necessary to construct these assemblies out of a large number of interlocking components. As a result, these aircraft door handle assemblies have proved to be both costly and difficult to manufacture and maintain.

SUMMARY OF THE INVENTION

This invention relates generally to an handle assembly for controlling the opening and closing of an aircraft door and disarming the emergency actuator that is attached to the door. More particularly, this invention is directed to a handle assembly with a pair of overlapping, telescoping shafts, one of which is connected to an inside handle, and one of which is connected to an outside handle. The shaft connected to the inside handle is longitudinally fixed and is connected to the door latch mechanism so as to control the opening and closing of the aircraft door. The shaft associated with the outside handle telescopes away from the other shaft and interlocks with that shaft for rotation when the outside handle is fully extended. A disarming mechanism connected to the telescoping shaft deactivates any emergency actuator attached to the door simultaneously with the extension of the handle.

The handle assembly of a preferred embodiment of this invention includes an outer shaft that is attached to a handle that is normally flush with the outer skin of the aircraft. An inner shaft is disposed partially in the outer shaft and has an exposed end, to which an inside handle and a linkage for actuating the door latch mechanism are attached. An inboard clutch half is attached to the outer shaft adjacent the inboard end of the shaft. An outboard clutch half is attached to the end of the inner shaft so that it is normally spaced from the inboard clutch half. A disarming mechanism is attached to the outer shaft so as to pivot when the shaft is extended.

When an aircraft door with which this invention is used is opened or closed from the inside, the inside handle is used to rotate the inner shaft in order to actuate the latch mechanism. Since the clutch halves are spaced from each other, this movement does not affect either the outer shaft or the outside handle. When the outside handle is used to open or close the door, the handle is initially pulled away from the aircraft. This movement extends the outer shaft so that the clutch halves interlock so as to cause the shafts to rotate in unison. The outside handle can then be turned so as to cause rotation of the shafts and actuation of the latch mechanism. The extension of the outer shaft also serves to trip the disarming mechanism so the disarming mechanism inhibits triggering of the door emergency actuator.

The handle assembly of this invention can be used to open or close an aircraft door regardless of which handle was last used to set the door state. Moreover, the outside handle assembly automatically engages that latch mechanism with which it is used and disarms any door emergency actuator with essentially a single motion. Thus, persons using this handle are not exposed to the possibility that persons inside the aircraft will trigger the emergency actuator so as to cause the door to rapidly open and deploy the escape slide.

While the outside handle assembly of this invention can perform these functions, it is constructed out of relatively few parts. The only components that move are those attached to the outside handle-and-outer-shaft subassembly. As a result, this handle assembly is relatively inexpensive to manufacture. Also, given the limited number of components, the assembly is relatively easy to install and maintain. Still another advantage of this handle assembly is that its components do not significantly add to the overall weight of the aircraft in which it is employed.

Moreover, the components that form the handle assembly of this invention are essentially all contained in the outer shaft or attached to the outside handle. The assembly can be fitted into a small handle box that is mounted to the aircraft. If the assembly requires extensive maintenance, it can readily be removed from an aircraft and a replacement assembly substituted therefor. Thus, an aircraft only need be taken out of service for a minimal amount of time should it become necessary to work on the outdoor handle assembly of this invention.

BRIEF DESCRIPTION OF THE DRAWINGS

This invention is pointed out with particularity in the claims. The above and advantages of this invention may be better understood by referring to the following descriptions taken in conjunction with the drawings, in which:

FIG. 3 is an exploded view showing the components of the outer and inner shafts of the door assembly of FIG. 2;

FIG. 4 is a cross-sectional view taken along lines 4—4 of FIG. 2 illustrating the handle assembly of this invention when the clutch halves are disengaged;

FIG. 5 is a perspective, detail view of the inner clutch half shown in FIG. 3;

FIG. 6 is a perspective, detail view of the outer clutch half shown in FIG. 3;

FIG. 7 is a perspective, detail view of the flanged nut shown in FIG. 3;

FIG. 8 is a perspective, detail view of the cover plate shown in FIG. 3 wherein some features of the cover plate are shown in phantom.

FIG. 10 is a perspective partial cutaway view of an alternative embodiment of an aircraft door handle assembly of this invention;

FIG. 11 is an exploded view showing the components of the handle assembly of FIG. 10;

FIG. 12 is a cross-sectional view of the handle assembly of FIG. 10; and

FIG. 12a is a detailed cross sectional view of the outer shaft-cover plate interface depicted in FIG. 12.

DETAILED DESCRIPTION OF THE INVENTION

Figure 1:
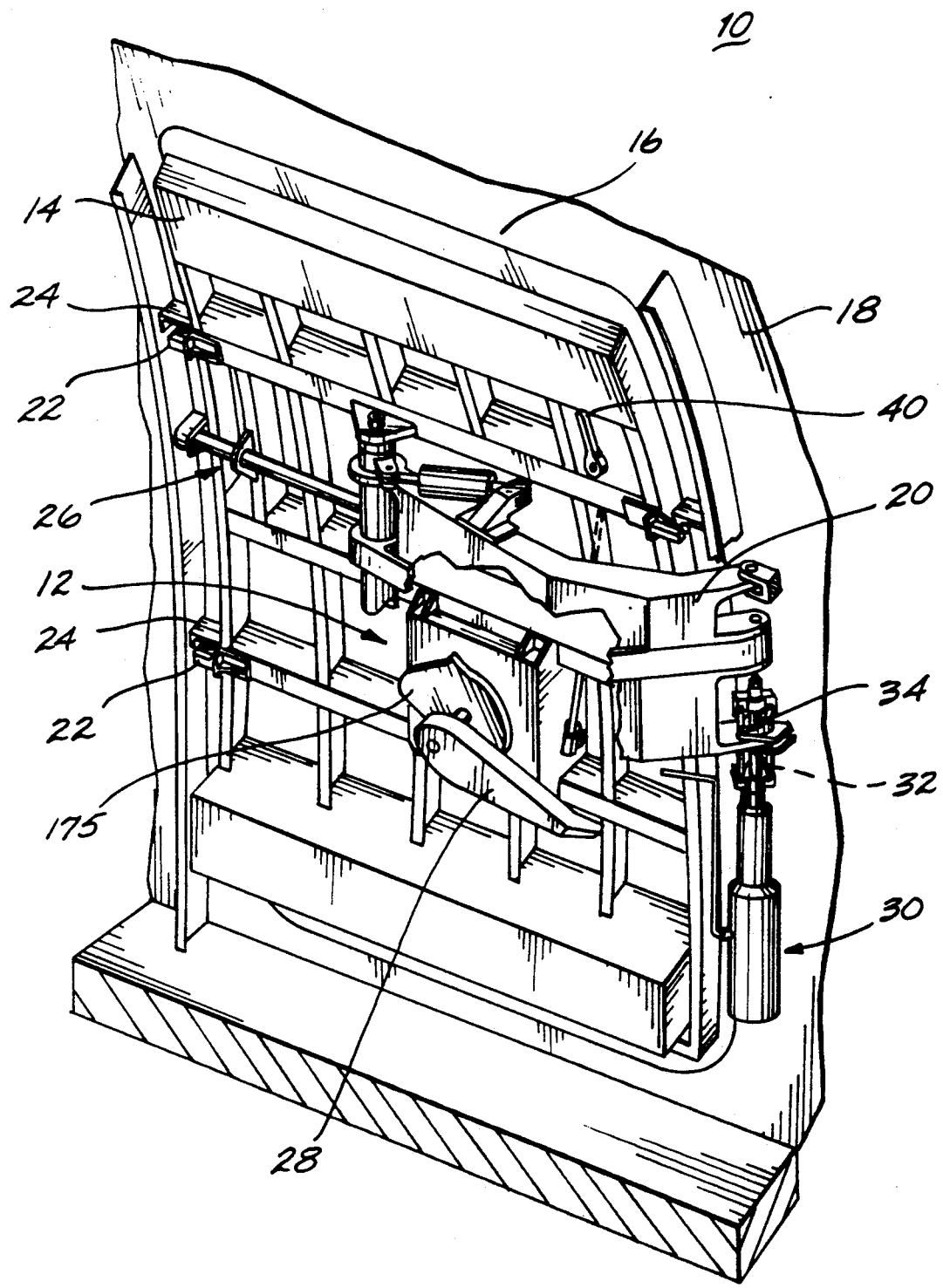
FIG. 1 is a perspective view showing the inside of an aircraft door assembly in partial cutaway in which the outdoor handle assembly of this invention is employed.

FIG. 1 is a perspective view of an aircraft door assembly 10 to which one preferred embodiment of a handle assembly 12 of this invention is attached. The door assembly 10 includes a door 14 fitted into an opening 16 formed inside an aircraft fuselage 18. A hinge 20 connects the door 14 to the inside of the fuselage 18 so that the door can move between open and closed positions. The sides of the door 14 are provided with a number of outwardly extending door stops 22, and the fuselage 18 is provided with a number of flanges 24 that project into the opening 16 adjacent the door stops. When the aircraft is in flight, high cabin pressure inside the fuselage 18, in comparison to lower atmospheric pressure urges the door 14 outwards so that door stops 22 abut the fuselage flanges 24 and seal the door shut. The opening and closing of the door 14 is controlled by a lift latch mechanism 26. When the door 14 is closed, the lift latch mechanism 26 controls the travel of the door so that initially, the door stops 22 pass over the fuselage flanges 24. After the door stops 22 clear the fuselage flanges 24, the lift latch mechanism lowers the door 14 so that the door stops abut the fuselage stops. When the door 14 is opened, the lift latch mechanism 26 first lifts the door upwards so that the door stops 22 clear the fuselage flanges 24 so that in turn, the door 16 can be moved outwards. The actuation of the lift latch mechanism 26 is controlled by the handle assembly 12 as will be described hereinafter. The handle assembly 12 includes a inside handle 28 so that actuation of the lift latch mechanism 26 and the opening and closing of the aircraft door 14 can be controlled from inside the aircraft.

A bustle 29 in which an inflatable escape slide, not shown, is stored is secured to the base of the door 14. The door assembly 12 also includes an actuator 30 that is attached to the fuselage 18-hinge 20 interface for rapidly opening the door 14. The actuator 30 comprises a gas fired piston 32 that has a rotating sleeve 34 to which the hinge 20 is attached. When the actuator 30 is triggered, the piston sleeve 34 is forced to rotate. The rotation of the piston sleeve 34 causes the hinge 20 to pivot about the fuselage 18 so that the door 14 is rapidly urged away from the opening 16. An arming mechanism, not shown, attached to the aircraft door 14 is used to control the triggering of the actuator 30. The arming mechanism also controls the inflation of the escape slide so that once the actuator 30 opens the door 14, the escape slide will automatically inflate. The armed/disarmed state of the actuator 30 is set by an arming lever 40 secured to the inside of the aircraft door 14 and connected to the arming mechanism. Flight attendants or flight crew members arm the actuator 30 by setting the lever 40 prior to the aircraft taking off; the actuator is disarmed prior to the normal departure of persons from the aircraft by returning the lever 40 to its original position.

Figure 2:
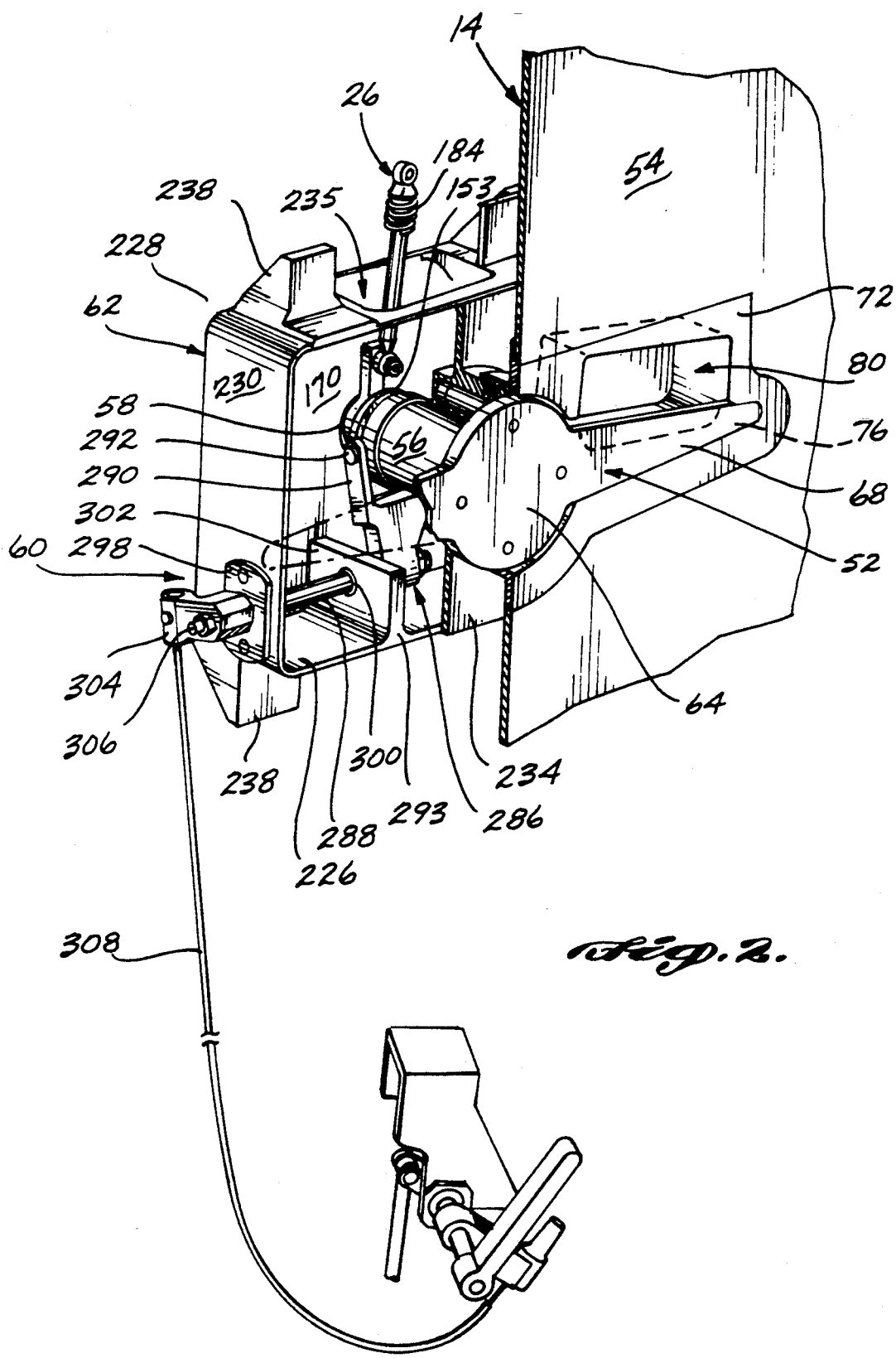
FIG. 2 is a perspective view in partial cutaway showing the handle assembly of this invention installed into an aircraft door when viewed from the outside.

As depicted in FIG. 2, the handle assembly 12 of this invention includes outside handle 52 that is normally seated flush with outer skin 54 of the aircraft door 14. An outer shaft 56 that extends through the door 14, is attached to the outside handle 52. The outer shaft 56 partially extends over an inner shaft 58 to which both the lift latch inside handle 28, and the lift latch mechanism 26 are connected, inside handle and lift latch mechanism not seen in this Figure. A disarming mechanism 60 is attached to the end of the outer shaft 56. The inner shaft 58 is fixed in place, it can rotate but it cannot move longitudinally. The outer shaft 56 is fixed to rotate with the outside handle and telescopes, or extends, away from the inner shaft 58 when the outside handle is pulled away from the aircraft door 14. Separate halves of a clutch assembly, not illustrated in this Figure, are attached to each shaft 56 and 58. The clutch halves are positioned on the hand shafts 56 and 58 so that they are normally spaced apart and, interlock when the outer shaft 56 is extended so that shafts will rotate in unison. The extension of the outer shaft 56 also actuates the disarming mechanism 60 so that the mechanism in turn disarms the door actuator 30. The outer shaft 56, the inner shaft 58, and the disarming mechanism 60 are all contained in a handle box 62 mounted to the inside of the aircraft door 14.

The outside handle 52, as depicted in FIGS. 2–4, is formed out of an integral piece of material and has a circular center hub 64 from which two symmetrical opposed blades, 66 and 68, respectively, extend. The rearward directed blade 68, is formed with a center flange 70 that is directed towards the inside of the aircraft fuselage 18. In the event the outside handle 52 becomes extended while in flight, the center flange 70 stabilizes the handle relative to the surrounding airflow so as to prevent its rotation. The outside handle 52 is normally seated in a handle pan 72 mounted to the outside of the aircraft door 14 flush with the outer skin 54. The handle pan 72 is formed with an opening 74 through which the outer shaft 56 extends into the aircraft fuselage 18. The handle pan opening 74 is defined by an inwardly extending cylindrical lip 75. The handle pan 72 defines a pair of recesses 76, one shown, in which the handle blades 66 and 68 are seated so that the handle 52 is flush with the outer skin 54 of the aircraft door 14. A hand access pocket 80 is also formed in the handle pan 72 inside of and adjacent to one of the recesses 76 in which the handle blade 68 is normally seated. The hand access pocket 80 is dimensioned to allow an individual outside the aircraft to reach in and pull the handle blade 68 outwards so the handle 52 can be used to actuate the lift latch mechanism 26.

A bolt 82 extends inwards from the center of the handle center of the handle center hub 64 as depicted in FIGS. 3 and 4. The bolt 82 is secured in place by a plate 84 that is mounted to the inside of the handle center hub 64. The center of the plate 84 is formed with an opening 86 through which the bolt extends. The portion of the plate 84 adjacent the opening 86 defines an indentation 88 in which the head of the bolt 82 is seated. In the illustrated embodiment of the invention, the plate 84 is generally semicircular in shape and is formed with a finger 89 that extends away from the opening 86. The irregular configuration of the plate 84 serves to minimize its weight. A tubular spacer 90 is disposed over the bolt 82 against the plate 84. A washer 92 and a nut 94 that are locked over the end of the bolt 82 secure the spacer 90 in place.

The outer shaft 56 is formed from an integral section of metal and has a main body 100 in the form of a open-ended cylinder. The inside wall of the inboard end of the shaft main body 100 is formed with longitudinally extending splines 102. The outer shaft main body 100 is also formed with a set of drain holes 104. In the depicted embodiment of the invention, the drain holes 104 are arranged in pairs wherein there are four pairs of longitudinally spaced apart drain holes disposed at 90° intervals around the shaft 56. The drain holes 104 allow pressurized air inside the fuselage 18 to flow between the outer and inner shafts, 56 and 58 respectively. This substantially reduces the pressure differential around the outer shaft 56 so as to prevent the outside handle 52 and outer shaft 56 sub-assembly from extending when the aircraft is at high altitude. The outer shaft main body 100 is formed with a relatively thin wall thickness approximately 50 to 120 mils (0.001 inches), and in a more preferred embodiment, approximately 85 mils.

The outer shaft 56 is formed with an annular flange 106 about the outboard end of the main body 100 that is attached to the outside handle 52. The flange 106 abuts the peripheral sections of the plate 84 that is disposed against the outside handle center hub 64. The outside handle 52, the plate 84, and the outer shaft 56 are secured together by threaded fasteners 107 that extend through openings 108, 110, and 112, that are respectively formed in the handle hub 64, the plate 84, and the shaft flange 106. The threaded fasteners are locked into nut plates 114 that are located around the shaft flange 106 adjacent from the main body 100. The nut plates 114 protect the fasteners 107 from the corrosive effects of environmental exposure.

A hold open post 116 is also attached to the outer shaft flange 106 adjacent the main body 100. The hold open post 116 has a relatively large diameter base 118 from which a cylindrical, smaller diameter open-ended stub 120 extends. A plastic pin 122 formed of Delrin TM, or other non-abrasive, plastic-like material, is secured into an open end of the hold open post stub 120. The hold open post 116 is secured to the outer shaft flange 106 by a pair of post flanges 126, one shown, that extend from the post base 118. Some of the threaded fasteners 107 that secure the outside handle 52 and the outer shaft 56 together also secure the hold open post 116 to the outer shaft. The post flanges 126 are provided with openings 128 for receiving the fasteners 107. The threaded fasteners 107 are held in place by nut plates 114 disposed against the post flanges 126.

The outer shaft 56 has an inner clutch half 130 that interlocks with an outer clutch half 132 attached to the inner shaft 58 when the outer shaft is extended. The inner clutch half 130, as shown in detail in FIG. 5, is generally tubular in shape and is fitted in the inboard end of the outer shaft 56 around the inner shaft 58. The outer surface of the inner clutch half 130 is formed with longitudinally extending splines 134 dimensioned to interlock with the splines 102 on the inside of the outer shaft 56 so that the clutch half and shaft rotate as one. The inner surface of the inner clutch half 130 is dimensioned to be spaced from the inner shaft 58. A ring 135 formed of a low friction plastic such as a type manufactured under the trade name Karon TM by the Kamatics Corporation of California is disposed inside the outboard end of the inner clutch half 130 around the inner shaft 58. The ring 135 provides a secure fit between the inner clutch half 130 and the inner shaft 56, while allowing the inner clutch half to freely slide along the inner shaft. The outboard end of the inner clutch half 130 defines a pair of symmetrically opposed notches 138. An annular space 139 around the inner shaft 58 is defined by the inboard edge of the ring 135 and the adjacent inside surface of the inner clutch half 130. The inner clutch half 130 is formed with a set of longitudinally extending bores 137 that extend the length of the clutch half. The bores 137 allow the pressure to equalize between both sides of the inner clutch half 130.

The inner clutch half 130 is held in the outer shaft 56 by a pair of pins 141, one shown, that extend into a pair of slots 140, one shown, formed in the inner clutch half. The pins 141 are fitted into opposed openings 142 formed in the inboard end of the outer shaft 56. The pins 141 are provided with outwardly beveled heads 144 and the pin openings 142 define complementary countersinks to prevent the pins from falling into the outer shaft 56. The slots 140 are symmetrically opposed from each other. The slots 140 extend longitudinally along the inner clutch half 130 and have a length that is greater than the diameter of the pins 141. The relatively long length of the slots 140 allows the inner clutch half 130 a limited range of longitudinal movement relative to the outer shaft 56.

A metal cap 146 is secured over the inboard end of the outer shaft 56 around the inner shaft 58. The cap 146 is formed of an integral piece of metal and has a tubular main section 148 that extends around the adjacent portion of the outer shaft 56. The main section covers the pins 141 so as to prevent the pins from falling out of place. An annular ring 150 that has a stepped cross-sectional profile extends inwards from the cap main section 148. The cap 146 is positioned so that the portion of the ring 150 adjacent the main section abuts the inboard end of the outer shaft 56. A cap top section 152, in the form of a flat annular ring, extends around the end of the cap stepped ring 150. The top section 152 extends around the inner shaft 58 and extends into the area subtended by the annular space 139 around the inner shaft. The annular ring 150 in combination with the adjacent surface of the cap top section 152 defines a groove 153 that runs along the outside of the cap 146. The cap 146 is secured to the outer shaft 56 by a retaining wire 154 that is fitted into complementary grooves 156 and 158 formed in the outside of the shaft and the inside of the cap main section 148. The cap main section 148 is formed with a pair of openings 160 that lead to the grooves 156 and 158 so that the retaining wire 154 can be fed therethrough. The retaining wire 154 is fed through one opening 160 until it extends out through the second opening 160. The exposed ends of the retaining wire 154 are bent over at 90° to prevent it from unraveling so as to leave the cap 146 unsecured.

A helical compression spring 162 is disposed in the annular space 139 around the inner shaft 58 between the inner clutch half inner ring 135 and the cap top section 152. The handle assembly 12 is arranged so that the spring 162 imposes an outwardly directed force against the inner clutch half 130. When the clutch halves 130 and 132 are spaced apart from each other, spring 162 biases the inner clutch half 130 the maximum distance away from the cap top section 152.

The inner shaft 58 is in the form of a generally cylindrical member and has an outboard section, which is normally overlapped by the outer shaft 56. The inboard section of the inner shaft 58, the section not covered by the outer shaft is mounted for rotation in an opening 168 formed in a base plate 170 that comprises part of the handle box 62. The portion of the inner shaft that extends outside of the handle box 62 is provided with a head 172 to which the inside handle 28 is attached. In the illustrated embodiment of the invention, the inner shaft head 172 and the inside handle 28 are shown as being threadedly secured together; other means to secure the two components together for simultaneous movement may, of course, be employed. The inner shaft 58 is formed with a first longitudinally splined outer surface 174 that is also located outside the handle box 62. A cam 175, partially shown, that is part of one lift latch mechanism 26, with which the handle assembly 12 of this invention can be used, is fitted over the first splined outer surface 174 to rotate in unison with the inner shaft 58. The inner shaft 58 has a second longitudinally splined section 180 located inside the handle box 62. A crank 182 is coupled to the second splined section 180 to rotate as one with the inner shaft 58. The free end of the crank 182 is coupled to a push rod 184, partially shown, that is part of the lift latch mechanism 26. When the inner shaft 58 is rotated, the inner shaft transfers the motion to the crank 182 so that the crank, through the push rod 184, actuates the lift latch mechanism 26.

The outer clutch half 132 is attached to the outboard end of the inner shaft 58. The outer clutch half 132, as seen in detail in FIG. 6, has an annular body 186 that is disposed between the outer and inner shafts 56 and 58, respectively. The inner surface of the inner clutch half body 186 and the adjacent outer surface of the inner shaft 58 are formed with complementary longitudinally extending splines 188 and 190, respectively, (FIG. 3) so that the clutch half 132 and the inner shaft 58 will rotate as one. The outer clutch half 132 is formed with a pair of symmetrically opposed, inwardly extending dogs 192 that are slightly spaced away from the outside of the inner shaft 58. The dogs 192 are dimensioned to be fitted into the notches 138 formed in the inner clutch half 130. A liner 194 formed of Karon or other low friction plastic is disposed around the outer surface of the inner clutch half body 186. The liner 194 which abuts the inner surface of the outer shaft 56, allows the outer shaft to move freely relative to the adjacent outer clutch half 132. The outer end of the clutch body 186 is formed with an inwardly directed step 196. A seal 197 (FIG. 3) in the form of an O-ring is disposed over the curvature 196 between the outer shaft 56 and the outer clutch half 132 around the step 196.

The inner shaft outboard section is formed with an axial bore 198 in which the outside handle bolt 82 and spacer 90 subassembly are normally disposed as depicted in FIG. 4. The bolt 82 and by extension, the outside handle 52 and the outer shaft 56, are held in place by a spring 200 that extends between the end of the bolt and a nut 202 located in the head of the bore 198. The nut 202, shown in detail in FIG. 7, has a sleeve 208 disposed inside the head of the shaft bore 198. Complementary threading 210 located along the wall of the bore 198 and the outside of sleeve 208 secure the nut in place, (threading only shown on the sleeve). A liner 214 formed of Karon or other low friction material is disposed around the inside of the sleeve 208 to provide a low-friction interface between the nut 200 and the outside handle assembly spacer 90. The edge of the liner 214 is spaced outboard from the open end of the sleeve 208 so as to define annular space 215 around the spacer 90 in which one end of the spring 200 is seated. The open end of the inner shaft 58 is formed with an annular groove 216 that is adjacent to and contiguous with the head of the bore 198. A seal 218 in the form of an O-ring is disposed in the groove 216 between the nut sleeve 208 and the inside wall of the inner shaft 58.

Figure 9:
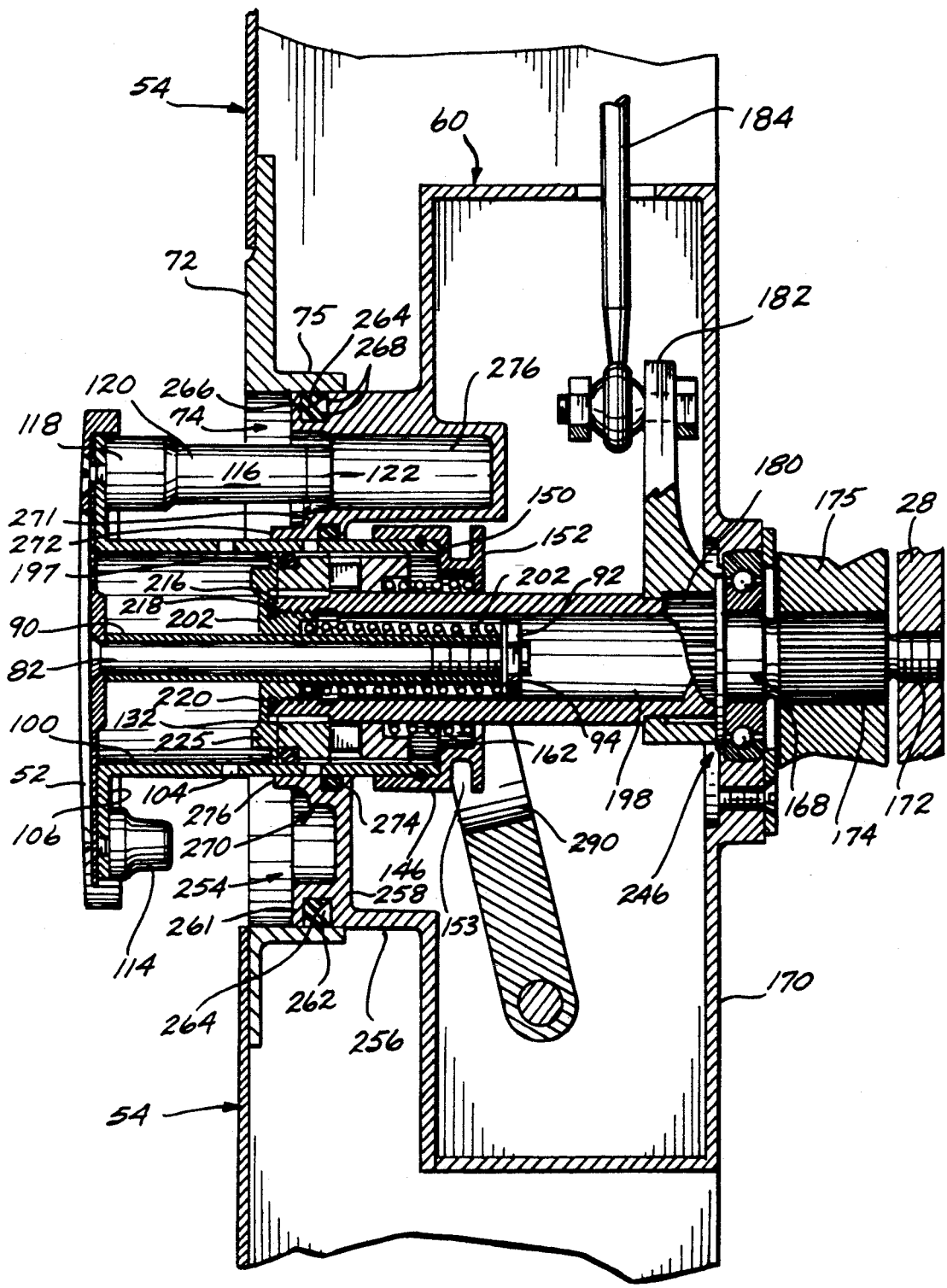
FIG. 9 is a cross-sectional view of the aircraft door assembly of this invention illustrating the handle assembly of FIG. 4 when the outside handle is extended and the clutch halves are engaged.

The nut 202 is formed with a multi-section flange 220 that is attached to the sleeve 202. The first, inner section 222 of the nut flange is an annular ring that is connected to the exposed section of the nut sleeve 208. The outer perimeter of the nut flange first section 222 subtends an area slightly greater than that subtended by the outer perimeter of the adjacent inner shaft 58. The second, outer section 224 of the nut flange is integral with and stepped inwards from the first flange section 222 so as to extend around the sleeve 208. The nut flange second section 224 is constructed to have an outer perimeter that abuts the inside surface of the outer shaft 56. An outward annular ridge 225, best seen in FIG. 9, is formed around the top of the second flange section 224 adjacent the outside handle plate 84. The inner surface of the ridge is dimensioned to abut the portion of the plate 84 that is inwardly directed so as to form the bolt head indentation 88. When the nut 202 is secured to the inner shaft 58, the flange inner section 222 extends over the groove 216 formed in the shaft to hold the seal 218 in place. The flange outer section 224 extends around the outside of the shaft so as to abut against the clutch outer half 132 so as to hold both the outer clutch half and seal 197 in place.

The spring 200 extends over the outside handle bolt spacer 90 between the space 215 adjacent the nut 202 and the washer 92 mounted on the bolt 82. The spring 200 is selected so that it normally urges the washer 92 and nut 202 away from each other. The nut 202 is attached to the inner shaft 58, which is longitudinally secured in place through connection to the lift latch mechanism 26. Consequently, the spring 200 exerts an inward force on the washer 92 and the outside handle 52 outer shaft 56 sub-assembly that are attached to the washer by bolt 82.

The handle box 62, as seen in FIG. 2, includes a lower side wall 226, an upper side wall 228, and a pair of opposed lateral side walls 230, one shown, that are formed integrally with the base plate 170. A cover plate 234 is secured over the exposed edges of the side walls 226–230 against the aircraft door 14. In the illustrated embodiment of the invention, the upper side wall is formed with an opening 235 through which the push rod 184 extends for attachment to other elements of the lift latch mechanism 26, not shown. The upper and lower side walls 226 and 228, respectively, are formed with tabs 238 designed to accommodate fasteners, not illustrated, that secure the handle box 62 to the aircraft door 14.

As seen in FIG. 4, a bearing assembly 240 is disposed about the opening 168 in the handle box base plate 170 through which the inner shaft 58 extends. In a preferred embodiment of the invention, assembly 240 is a single row, self aligning bearing assembly with an inner race 241, an outer race 242 and an outer frame ring 243. The inner race 241 is snugly fitted about the inner shaft 58 between the first and second splined sections, 174 and 180 respectively. A set of bearings 244 disposed between the two races 241 and 242 provide a low-friction interface therebetween. The outer surface of the outer race 242 is outwardly curved and the race is seated in the outer frame ring 243 that is formed with a complementary concaved curvature. The complementary curvatures allow the inner and outer races 241 and 242 to axially shift position relative to the axis of the outer frame ring 243. This shift facilitates assembly of the handle assembly 12 in the event the inner shaft 58 is not precisely aligned with the center of the cover plate opening 168. The bearing assembly 240 is secured in the cover plate opening 168 by one or more snap-type fastening members 245 that provide a compression fit between the base plate 170 and the outer frame ring 243. A set of low friction shim washers 246, two shown, provide an interface between the crank 182 and the base plate 170 bearing assembly 240 so as to ensure that the crank can freely rotate.

The cover plate 234 is secured to the handle box 62 by threaded fasteners 248 that extend through openings 250 in the cover plate, as seen in FIG. 3, and complementary threaded bores in the box side walls 226–230, bores not shown. The cover plate 234, shown in detail in FIGS. 8 and 9, is formed with a circular hub 254 that extends outwards and is fitted into the opening 74 formed in the handle pan 72. The center hub 254 has a cylindrical ring 256 that extends outwards from the surface of the cover plate 234. An annular lip 258 extends inwards from the end of the cylindrical ring 256. The lip 258 defines an opening 260 in the hub 254 in which the outer shaft 56 is disposed. An outer flange 261 extends outwards from the hub lip 258 adjacent the handle pan lip 75. The outer flange 261 has an inverted-L-shape profile and is positioned so the end thereof is disposed against the handle pan lip 75. The outer flange 261, in combination with the adjacent outer section of the hub lip 258, define an annular groove 262 with a rectangular profile that extends around the outer surface of the cover plate hub 254.

An annular seal 264 (FIG. 9) is disposed in the groove 262 between the handle pan 72 and the cover plate hub 254. The seal has an outboard face 266 that is flat and that is disposed against the surface of the outer flange 261 parallel with the hub lip 258. Opposite the outboard face 266, the seal 264 is formed with two outwardly directed lips 268 that are spaced apart from each other. One outer lip 268 abuts the adjacent surface of the outer flange 261. The outer lip 268 abuts the handle pan lip 75. When the aircraft is in flight and the fuselage 18 is pressurized, air pressure urges the seal outboard face 266 and the lips 268 against the surfaces they abut so that the seal 264 blocks the escape of air from the fuselage.

A cover plate hub lip inner flange 270 is disposed around the hub opening 260. The hub lip outer and inner flanges, 261 and 270, respectively, are spaced a sufficient distance apart from each other so that the outside handle assembly nut plates 114 and hold open post 116 can be readily fitted therebetween. The inner flange 270 is formed from first and second outwardly extending cylindrical rings 271 and 272 respectively. The first flange ring 271 extends outwards from the hub lip 258 and is spaced away from the hub opening 260. The second flange ring 272 extends outward from the first flange ring 271 and is spaced inwards therefrom so as to have an inside surface that subtends the hub opening 260. A Karon liner 273 is disposed around the inside of the second flange ring 272 to provide a low friction interface with the outer shaft 56. A seal 274, in the form of an O-ring, is disposed in a groove 275 formed between the flange rings 271 and 272 adjacent the outer shaft 56.

The cover plate 234 is provided with a hold open pin recess 276 that is defined in a solid arcuate section 277 of the plate between the inner and outer flanges, 261 and 270 respectively. When the outside handle 52 is the secured position, the hold open pin 116 is disposed in the recess 276. A drain channel 278, shown in phantom, extends through the solid section 277 between the base of hold open pin recess 276 and an opening 279 in the hub lip 258. As seen in FIG. 8, the drain channel 278 and opening 279 are bottom oriented relative to the hold open post recess 276. When rain or snow enters the recess 276, it will thus flow through the drain channel 278 and out of the opening 279. This prevents the hold open post from becoming clogged with water, which, if allowed to freeze, could hold the hold open post 116 in place and prevent retraction of the outside handle 52.

The disarming lever 60, as shown in FIG. 2, includes a crank 286 which is coupled to the outer shaft 56 and a shaft 288 that is attached to the crank and mounted to the base of the handle box 62. The crank 286 includes a pair of stems 290, one shown, each of which is provided with an inwardly directed pin 292, one shown. The pins 292 extend into the annular groove 153 in the cap 146 attached to the end of the outer shaft 56 and are dimensioned so that they do not interfere with the rotation of the outside handle 52-outer shaft 56 sub-assembly. In some embodiments of the invention, small rollers, not illustrated, may be fitted over the pins so as to reduce the friction at the cap 146-crank 286 interface. The disarming lever shaft 288 extends from the crank 286 to outside one of the handle box lateral side walls 230. The shaft 288 is secured in an opening formed in a base section 293 from which the crank stems 290 extend. The shaft is secured to the crank 286 to rotate when the crank pivots. In one preferred embodiment of the invention, the end of the shaft 288 and the opening formed in the crank 286 are provided with complementary longitudinally extending splines to insure that the crank and the shaft move in unison. The shaft 288 is mounted for rotation to the handle box in openings formed in one of the handle box lateral side walls 230 and in a rectangular plate 302 formed integrally with the handle box 62 that extends perpendicularly between the hinge cover base plate 170 and the lower side wall 226. Bearing assemblies, 298 and 300, are fitted in openings between the shaft 288 and the handle box 62 so as to reduce the friction therebetween. The bearing assemblies 298 and 300 may be in the form of actual roller bearings or low friction plastic liners.

A cable clamp 304 is attached to the end of the crank shaft 288 that extends out of the handle box 62. The cable clamp 304 is formed with a spline bore, not illustrated, designed to be coupled with an adjacent splined surface of the crank shaft, surface not illustrated, so that when the crank shaft 288 is rotated, the cable clamp will pivot. A threaded fastener 306 is fitted over a complementary threaded surface in the end of the crank shaft 288 adjacent the cable clamp 304 so as to hold the cable clamp in place.

A disarming cable 308 extends between the cable clamp 304 and the actuator arming lever 40, which is shown for convenience of illustration below the handle assembly 12 in FIG. 2, the end of the cable 304 attached to the arming lever 40 is secured to a cable clamp 310 integrally attached to the arming lever. A cable housing 312 cover most of the cable 308 except for a portion adjacent the arming lever cable clamp 310. When the actuator 30 is armed, the arming lever 40 is rotated so as to place a tension on the disarming cable 308. In the event the outside handle 52 is not completely stowed in the handle pan 72, the tensions of the disarming cable 308 will serve to pull the outside handle 52-outer shaft 56 assembly inward into the fully stowed position. When the outside handle 42 is extended, the disarming cable 308 is pulled outwards. The disarming cable 308 rotates the arming lever 40 so as to automatically disarm the actuator 30.

When the handle assembly 12 of this invention is installed on an aircraft door 14, the inner clutch half 130 attached to the outer shaft 56 is normally spaced away from the outer clutch half 132 attached to the inner shaft 58. The lift latch mechanism 26 with which the handle assembly 12 is used to actuate from inside the aircraft by simply rotating the inner shaft 58 by pivoting the inside handle 28. The opening or closing of the aircraft door 14 from inside the aircraft does not affect the outside handle 52 or the outer shaft 56 because they are disconnected from the inner shaft 58.

When the aircraft is in flight, the drain holes 104 in the outer shaft 56 and the vent bores 137 in the inner clutch half 130 allow pressure to equalize so the of components of the handle assembly 12 outside the inner shaft 58 are at the fuselage pressure. Only the outer shaft 56 is exposed to the fuselage pressure-outside pressure differential. Since the outer shaft 56 has a relatively thin wall, the piston area exposed to the pressure differential is quite small. As a result, the pressure imposes only a minimal outward force against the outside handle 52-outer shaft 56 sub-assembly. The inward force of the spring 200 is sufficient to overcome this outward force. Thus, the outside handle 52 is prevented from extending while the aircraft is in flight.

The outside handle 52 of this invention is used to close the aircraft door 14 by initially reaching into the handle pan recess 80 pulling the handle away from the skin 54 of the aircraft door 14. This movement automatically pivots the disarming lever crank 286 so that, in turn, the cable clamp 304 places a tension on the disarming cable 308 so as to rotate the arming lever 40 and disarm the actuator 30. Thus, the simple, initial act of extending the outside handle 52 prevents automatic triggering of the actuator 30 which could result in the door 14 rapidly moving outward and striking the persons on the outside.

As the outside handle 52 is extended, the inner clutch half 130 is moved outwards towards the outer clutch half 132. If the inner and outer clutch halves 130 and 132 are perfectly aligned, the dogs 192 automatically couple into notches 138 formed in the inner clutch half so that rotation of the outside handle 52 and outer shaft 56 will, in turn, cause rotation of the inner shaft 58 and subsequent actuation of the lift latch mechanism 26. If the clutch halves 130 and 132 are not in alignment, the outside handle 52 is then rotated to cause the clutch halves to couple together. Once the hold open post 116 has cleared the post recess 276, the outside handle can be rotated. The hold open post rub pin 122 will abut the cover plate hub lip 258 so as to prevent the spring 200 from pulling the handle 52 inwards so that a person rotating the handle will not have to exert significant additional outward force or bruising his/her knuckles. When the outside handle 52 and outer shaft 56 are so extended, the inner clutch half 130 is compressed between the outer clutch half dogs 192 and the outer shaft end cap 146 so as to compress spring 162. As the outside handle 52 is rotated, the inner clutch half notches 138 will fall into alignment with the outer clutch half dogs 192. When the clutch halves 130 and 132 are so aligned, the spring 162 will urge the inner clutch half 130 towards the outer clutch half 132 so that the clutch halves will interlock. Continual rotation of the outside handle 52 will causes the inner shaft 58 to simultaneously turn so as to actuate the lift latch mechanism 26. Since the inner and outer clutch halves 130 and 132 are provided with a pair of symmetrically opposed notches 138 and dogs 192, the outer shaft are never be rotated more than 180° before the clutch halve interlock. This minimizes the amount of time that is required to manipulate the outside handle 56 in order to actuate the lift latch mechanism 26.

Another feature of the handle assembly 12 of this invention is that while multi-functional, it is composed of relatively few parts. This serves to reduce both the cost and complexity of manufacturing and maintaining the assembly 12. More, the components that form the handle assembly 12 of this invention all are relatively lightweight so that the handle assembly does not add significantly to the overall fixed weight of the aircraft. Another related feature of this invention is that the majority of the components forming this handle assembly can be fitted into the relatively small area of the handle box 62. Moreover, in the event that extensive maintenance of the assembly 12 is required, it can readily be disconnected from the door with which it is used and a new unit installed. There is no need to take an aircraft out of service solely to work on the handle assembly 12 of this invention.

An alternative preferred embodiment of a handle assembly 340 of this invention is illustrated in FIGS. 10, 11 and 12. This handle assembly 340 includes the same basic outside handle 52-outer shaft 56 and inside handle 28-inner shaft 58 sub-assemblies employed in the first described embodiment of this invention. The same inner and outer clutch halves 130 and 132 respectively are used to interlock the inner and outer shafts 56 and 58, respectively, when the outside handle 52-outer shaft 56 sub-assembly is extended.

Handle assembly 340 includes a hold open sleeve 342 with which a metal cap 344 secured to the free end of the outer shaft 56 interlocks so as to prevent the outside handle 52-outer shaft 56 from moving inwards when the sub-assembly is in the extended state. The hold open sleeve 342 is formed out of a single piece of metal and is disposed around the outer shaft 56. The hold open sleeve has a cylindrical ring 346 located adjacent where the outer shaft extends through an opening 348 formed in a handle box cover plate 350. The sleeve ring 346 is spaced away from the outer shaft 56. The hold open sleeve 342 is secured to the handle box cover plate 350 by an annular flange 352 that extends from the outboard edge of the sleeve ring 346. Appropriate fastening members 353, shown in FIG. 10, extend through openings formed in the handle box cover plate 350 and openings 347 formed in the sleeve flange 352 hold the sleeve 342 in place. The inboard end of the sleeve ring 346 is formed with a center-directed annular lip 354. The free end of the lip 354 is spaced slightly away from the outer shaft 56 so that hold open sleeve does not effect the movement of the shaft. The hold open sleeve is formed with two opposed U-shaped fingers 356 that extend inward from the fixed end of the hold open ring 346. The fingers 356 each define a separate channel 358 that extends from the free end of the hold open sleeve 342 to the annular space defined by the hold open ring 346 and the associated lip 354.

The metal cap 344 is similar to the metal cap 146 (FIG. 3) described with respect to the first embodiment of the invention. The cap 344 is shaped so as to form a groove 360 identical to the groove 153 of the previously described cap 146. Cap 344 is formed with a pair of tabs 362 that extend outwards from the main body of the cap and that are dimensioned to travel in the hold open sleeve channels 358. The cap 344 is secured to the outer shaft 56 by pins 364 that extend through openings 265 formed in the tabs 362, openings formed in the outer shaft 56, and into the slots 140 (FIG. 5) formed in the inner clutch half 130. The pins 364 are formed with a first base section that is compression fitted into the tab openings 365. A second, shoulder, section having a smaller diameter than the base section extends from the pin 364 base section and is compression fitted in the complementary pin opening 142 formed in the outer shaft 56 to insure positive positioning upon installation. The pin 364 has a third, finger, section having a smaller diameter than the shoulder section that extends into the outer shaft and into the slots 140 formed in the inner clutch half 130. When the handle assembly 340 is assembled the exposed heads of the pins 364 are disposed against the portion of the hold open sleeve fingers 356 that define the channels 358. The fingers 356 trap the pins 364 in the event the compression loading is lost. In a preferred embodiment of the invention, the base of the pins 364 may be provided with an exposed, threaded internal bore to facilitate the insertion of a fastening tool for inserting and removing the pins. Alternatively, the pins 364 may be formed with a threaded surface so that they can be secured to a complementary threaded surface formed in the cap tab openings 365.

In this embodiment of the handle assembly 340, the outside handle 52-outer shaft 56 sub-assembly is normally urged inward by a return spring 372 located around the outside of the shaft and the hold open sleeve 342. The return spring 372, which is in the form of a conventional helical expansion spring, extends between the hold open sleeve flange 352 and a disarming ring 374 attached to the end of the cap 344. The disarming ring 374 is in the form of a circular collar formed with a center opening 376 that allows the ring to be fitted over the cap 344. The disarming ring is formed with a pair of opposed notches 378 integral with the center opening 376 that allow the ring to be passed over the hold open sleeve fingers 356. The disarming ring 374 is secured to the cap 344 by a set of pins 380 that extend through openings 382 formed in the ring into the cap groove 360. The disarming ring 374 and the pins 380 are dimensioned so that the cap 344 can freely rotate relative to the ring. The pins 380 and ring openings 382 may be formed with complementary threaded surfaces to allow the pins to be secured in place.

The disarming ring 374 is formed with a pair of outwardly extending tabs 384 to which the actuator disarming cable 308 is attached. In a preferred embodiment of the invention, a small ball or cylinder 383 is attached to the end of the cable 308; the tabs 384 which are only slightly spaced apart from each other, are formed with complementary indentations 385 that serve to capture the end piece attached to the cable. The second end of the disarming cable 308 is attached to the actuator arming lever 40 as described with reference to FIG. 10. When the arming lever is set to the "armed" state, the lever places a tension on the disarming cable 308. In the event that the outside handle was left in the extended position, the disarming cable will be prevented from finally retracting. This will inhibit the setting of the arming lever 40 (FIG. 2) to serve as indication to the flight and cabin crew that the handle 52 is not in the stowed position. When the outer handle 52 is extended, the disarming ring 374 is similarly moved outwards. The motion of the disarming ring 374 pulls on the disarming cable 308 so as to rotate the arming lever 40 and disarm the actuator 30.

The outer clutch half 132 is secured in place in this handle box assembly 350 by a clutch retaining bolt 390 that is secured to the inner shaft 58. The clutch retaining bolt 390 has a sleeve 392 formed with external threading that is secured inside the shaft bore 198. The clutch retaining bolt 390 has an annular lip 394 that extends from the top of the sleeve 392 across the inner shaft 52 to adjust the inside wall of the outer shaft main body 100. The flange 394 is formed with an annular groove 396 adjacent the abutting portion of the outer clutch half 132. A seal 395, in the form of an O-ring, is seated in the groove 396.

The handle box cover plate 350 of handle assembly 340 is depicted as a generally cylindrical member that is attached to the other elements of an alternative handle box 397. The cover plate 350 has an outboard end that is seated in the handle pan opening 74. The cover plate 350 has an inboard end with a circular flange 351 to which fasteners are attached for coupling the cover plate to the rest of a handle box 397, fasteners not shown. The outboard end of the cover plate 350 has an inward directed lip 398 which defines the opening 348 in which the outer shaft 56 is seated. The cover plate lip 398 is the surface against which the hold open sleeve flange 352 is secured. The outer perimeter of the cover piece lip 398 is provided with an inverted L-shaped flange 400 that is spaced slightly inward from the outer perimeter of the lip. The lip 398 and associated flange 400 define an annular space around the outside of the lip in which the previously described seal 264 is seated. A bushing 401 is seated around the perimeter of the opening 348 between the cover plate and the outer shaft 56. The bushing 401 is formed of aluminum and has a tubular body 402 seated in the opening 348 and an annular flange 404 disposed against the inboard surface of the cover piece lip 398. The adjacent portions of the cover piece lip 398 is formed with an L-shaped notch 406 to facilitate the seating of the bushing 401. A liner 408 formed of Karon or other low friction material is disposed around the inside of the bushing body 402 to provide an interface that allows the ready movement of the outer shaft 56 relative to the cover plate 350.

The cover piece lip 398 is formed with an outward extending cylindrical flange 414 that is located around the opening 397. The bushing 401 is seated against the cylindrical flange 414. The inside surface of the cylindrical flange is formed with a groove 416 in which a seal 418 is seated. The seal 418, as depicted in FIG. 12a, is circular and has a main body 420 disposed in the groove and a pair of opposed flanges that 421 that are disposed against the cover piece lip flange 414 and the outer shaft 56. The seal also has a small lip section 424 located along its outer circumference that is disposed against the cover piece lip flange 414 and that is spaced away from the ring-shaped section 422. When the aircraft is in flight, cabin pressure urges the seal flanges 421 against the adjacent surfaces so as to provide a gas-tight barrier.

In FIG. 12 a cam 424 is depicted as being secured for rotation to the inner handle shaft 58. The cam 424 is part of an alternative lift latch mechanism 26 with which the handle assembly of this invention can be used. Also in this Figure, the inside handle 28 is shown as being fitted over complementary splines on the inner handle shaft 58.

In this embodiment of the handle assembly 340, the return spring 372 imposes an inward-directed force against the disarming ring 374 so as to hold the outside handle 52-outer shaft 56 sub-assembly in place. An advantage of employing the return spring 372 is that it eliminates the need to provide the bolt 82-and-spacer 90 sub-assembly and associated mounting components described with respect to the first embodiment of the invention. In handle assembly 340, the inner shaft 58 is still formed with the axial bore 198 in order to facilitate the mounting of the clutch retaining bolt 390 and to reduce the overall weight of the assembly.

When use of the outer handle 52 is desired, the outer shaft cap tabs 362 are prevented from rotating prior to the full extension of the outer handle by the hold open sleeve finger channels 358. Thus, unless the inner shaft 58 has been rotated, the outer clutch half dogs 192 interlock with the inner clutch half notches 138 simultaneously with the full extension of the outer handle. This reduces the amount of time required to use the outer handle to open or close the aircraft door 14. Moreover, once the outer handle 52 is fully extended, the outer shaft cap tabs 362 abut against the hold open sleeve ring lip 354 so as to prevent the handle from being forced inward by the return spring 372. This eliminates the need to provide the hold open post and the associated holding post recess described with respect to the first embodiment of the invention. By eliminating the hold open post recess the number of exposed components is minimized so as to minimize the number of locations where either liquid or solid precipitation can enter the handle assembly and inhibit its operation.

Still another advantage of this invention is that the hold open sleeve fingers 356 prevent the disarming collar 374 from rotating during either the extension or rotation of the handle assembly 340. This makes it possible to connect the disarming cable 308 directly to the disarming ring 374 to minimize the number of required components. Moreover, the pins 364 fasten the cap 344 to the outer shaft 56 so as to eliminate the need for coupling the components together with a retaining wire. This simplifies the effort required to assemble the handle assembly 340 of this embodiment of the invention.

The above detailed description has been limited to the specific embodiment of this invention. It will be apparent, however, that variations and modifications can be made to this invention with the attainment of some or all of the advantages thereof. For example, alternative embodiments of the invention may be desirable to provide an outer shaft at a fixed longitudinal position in the aircraft fuselage 18, and an inner shaft attached to the outside handle that telescopes outwards when the outside handle is extended. Specific subassemblies of components of this invention similarly may differ widely from what has been described. For example, in some embodiments of the invention it may be desirable to form the outer shaft end cap and inner clutch half as a single piece with gear-type teeth that are adapted to meet with complementary teeth on the outer clutch half. Moreover, it should be clear that the invention can be practiced without all the disclosed features of the described embodiment. For example, in some versions of the invention it may not be necessary to provide the handle box 62. Also, the actuator disarming lever may have a different construction than what has been described. For example, in some versions of the invention it may be desirable to provide an electronic switch that is mechanically connected to the extending shaft of this invention so that the extension state of that shaft element in turn sets the switch state. It should be clear that the assembly 12 of this invention need not always be mounted in the door with which it is used. Depending on the particular latch mechanism with which the assembly is used, it may be desirable to mount it to the fuselage adjacent to the door.

Therefore, it is the object of the appended claims to cover all such variations and modifications to come with the true spirit and scope of the invention.

The embodiments of the invention in which an exclusive property or privilege is claimed are defined as follows:

1. A handle assembly for actuating a door latch mechanism mounted to a body member comprising:
   an inner shaft and an outer shaft disposed over said inner shaft wherein each said shaft is rotatably mounted to the body member, one said shaft is secured to the door latch mechanism for actuating the door latching mechanism, and said other shaft telescopes away from said latch mechanism actuating shaft;
   an inside handle secured to said latch mechanism actuating shaft for rotating said shaft;
   an outside handle secured to said telescoping shaft for extending and rotating said shaft;
   a clutch outer half attached for rotation to said latch mechanism actuating shaft;
   a clutch inner half configured to interlock with said clutch outer half, attached for rotation to said telescoping shaft, and positioned so that when said shafts overlap said clutch halves are spaced apart, and when said telescoping shaft is extended said clutch inner half is disposed against and interlocks with said clutch outer half so that said shafts rotate in unison; and
   a biasing element connected between the body member and said telescoping shaft for imposing a force on said telescoping shaft in opposition to extension of said telescoping shaft so that said clutch halves are normally spaced apart.

2. The handle assembly of claim 1 wherein the body member to which said shafts are mounted is an aircraft door.

3. The handle assembly of claim 1 wherein said biasing element is a spring.

4. The handle assembly of claim 1 further including a clutch-biasing element disposed between one of said clutch halves and said shaft with which said one clutch half is associated for urging said one clutch half toward said other clutch half.

5. The handle assembly of claim 4 wherein said clutch biasing element is a spring.

6. The handle assembly of claim 1 further including disarming means attached to a door actuator arming/disarming mechanism, said disarming means including a disarming member attached to said telescoping shaft for movement therewith, whereby when said telescoping shaft is extended, said disarming member moves so as to set the actuator arming/disarming mechanism to a disarmed state.

7. The handle assembly of claim 1 wherein:
   said inner shaft is coupled to the door latch mechanism to actuate same, said inside handle is attached to said inner shaft to rotate said shaft, and said outer clutch half is attached to said inner shaft at a position distal from said inner shaft; and
   said outer shaft telescopes away from said inner shaft, said outside handle is attached to said outer shaft over said inner shaft, and said inner clutch half is mounted for rotation to said outer shaft over said inner shaft and is spaced away from said outside handle.

8. The handle assembly of claim 7 further including a clutch biasing element disposed between one of said clutch halves and said shaft with which said clutch half is associated for urging said clutch half towards said other clutch half.

9. The handle assembly of claim 8 wherein:
   said inner clutch half is mounted inside said outer shaft so as to have a limited range of longitudinal movement in said outer clutch half;
   said outer clutch half is provided with an end piece that extends over said inboard end around said inner clutch half; and
   a spring is disposed between said outer shaft end piece and said inner clutch half so as to urge said inner clutch half towards said outer clutch half.

10. The handle assembly of claim 9 wherein said outer clutch half end piece is an end cap disposed over said outer clutch half inboard end, and said cap is formed with an opening through which said inner shaft extends.

11. The handle assembly of claim 7 further including disarming means attached to a door actuator arming/disarming mechanism, said disarming means including a disarming member attached to said outer shaft for movement therewith, whereby when said outer shaft is extended, said disarming member moves so as to set the actuator arming/disarming mechanism to a disarmed state.

12. The handle assembly of claim 11 wherein said disarming means includes: a crank positioned to pivot when said outer shaft is extended; a shaft connected to said crank to rotate when said crank pivots; a cable clamp connected to said shaft; and, a cable extending between said cable clamp and said actuator arming/disarming mechanism.

13. The handle assembly of claim 12 wherein:
   said outer shaft is provided with an exposed annular groove; and
   said disarming lever crank further includes a projection disposed in said telescoping shaft groove.

14. The handle assembly of claim 7 wherein said biasing element is disposed in said outer shaft and extends between said shafts for opposing extension of said outer shaft.

15. The handle assembly of claim 14 wherein:
   said inner shaft outboard end is formed with an axially extending bore and has a fastener with an opening that extends coaxially with said bore and is secured in said bore;
   said outer shaft further includes a rod element connected to said outside handle and extending into said inner shaft bore through said fastener opening and said rod element has a head structure distal from said outside handle located in said inner shaft bore; and
   said biasing element is a spring, and said spring is disposed in said inner shaft bore around said outside handle rod element between said inner shaft bore fastener and said outside handle rod head element for exerting inward force on said outside handle and said outer shaft.

16. The handle assembly of claim 1 wherein said shafts are disposed in a handle box attached to the body member and said outside handle is normally disposed in a handle pan mounted to the outside of the body member flush with the outer skin of the body member and said handle pan is formed with a recess in which said outside handle is disposed so that said outside handle is normally flush with the body member outer skin.

17. The handle assembly of claim 16 wherein said handle pan is formed with an opening, said handle box is provided with an outwardly extending hub adapted to be fitted into said handle pan opening and said hub is formed with an opening through which said outer shaft extends.

18. A handle assembly for actuating a door latch mechanism mounted to a body member, the body member having a door actuator arming/disarming mechanism, said assembly comprising:
an inner shaft and an outer shaft disposed over said inner shaft wherein each said shaft is rotatably mounted to the body member, one said shaft is secured to the door latch mechanism for actuating the door latching mechanism, and said other shaft telescopes away from said latch mechanism actuating shaft;
an inside handle secured to said latch mechanism actuating shaft for rotating said shaft;
an outside handle secured to said telescoping shaft for extending and rotating said shaft;
a clutch outer half attached for rotation to said latch mechanism actuating shaft;
a clutch inner half configured to interlock with said clutch outer half, attached for rotation to said telescoping shaft, and positioned so that when said shafts overlap said clutch halves are spaced apart, and when said telescoping shaft is extended said clutch inner half is disposed against and interlocks with said clutch outer half so that said shafts rotate in unison; and
a disarming means attached to the door actuator arming/disarming mechanism, said disarming means including a disarming member attached to said telescoping shaft for movement therewith, whereby, when said telescoping shaft is extended, said disarming member moves to set the actuator arming/disarming mechanism to a disarmed state.

19. The handle assembly of claim 18 wherein the body member to which said shafts are mounted is an aircraft door.

20. The handle assembly of claim 18 wherein said disarming means includes: a crank positioned to pivot when said telescoping shaft is extended; a shaft connected to said crank to rotate when said crank pivots; a cable clamp connected to said shaft; and, a cable extending between said cable clamp and the door actuator arming/disarming mechanism.

21. The handle assembly of claim 20 wherein:
said telescoping shaft is provided with an exposed annular groove; and
said disarming lever crank further includes a projection disposed in said telescoping shaft groove.

22. The handle assembly of claim 20 wherein:
said shafts are disposed in a handle box attached to the body member and said outside handle is normally disposed in a handle pan mounted to the outside of the body member flush with the outer skin of the aircraft fuselage and said handle pan is formed with a recess in which said outside handle is disposed so that said outside handle is normally flush with the body member outer skin; and
said disarming means shaft is pivotally mounted to said handle box.

23. The handle assembly of claim 18 further including a biasing element disposed in said outer shaft and extending between said shafts for opposing extension of said telescoping shaft so that said clutch halves are normally spaced apart, and a clutch-biasing element disposed between one of said clutch halves and said shaft with which said one clutch half is associated for urging said one clutch half toward said other clutch half.

24. A handle assembly for actuating a door latch mechanism mounted to a body member comprising:
an inner shaft and an outer shaft disposed over said inner shaft wherein each said shaft is rotatably mounted to the body member, one said shaft is secured to the door latch mechanism for actuating the door latching mechanism, and said other shaft telescopes away from said latch mechanism actuating shaft;
an inside handle secured to said latch mechanism actuating shaft for rotating said shaft;
an outside handle secured to said telescoping shaft for extending and rotating said shaft;
a clutch outer half attached for rotation to said latch mechanism actuating shaft;
a clutch inner half configured to interlock with said clutch outer half, attached for rotation to said telescoping shaft, and positioned so that when said shafts overlap said clutch halves are spaced apart, and when said telescoping shaft is extended said clutch inner half is disposed against and interlocks with said clutch outer half so that said shafts rotate in unison; and
a biasing element disposed around said outer shaft and extending between the body member and said outer shaft for imposing a force on said outer shaft in opposition to extension of said outer shaft so that said clutch halves are normally spaced apart.

25. The handle assembly of claim 24 wherein the body member said shafts are mounted to is an aircraft door.

26. The handle assembly of claim 24 further including a ring mounted to said outer shaft adjacent said inner clutch half and wherein said biasing element is a spring disposed over said outer shaft that extends between the body member and said outer shaft ring.

27. The handle assembly of claim 26 further including a sleeve disposed around said outer shaft adjacent the body member and attached at one end to the body member and wherein said outer shaft ring and said spring are disposed over said sleeve.

28. The handle assembly of claim 27 further including: at least one tab extending outwardly from said outer shaft wherein said tab is spaced from said outside handle; and wherein said sleeve is formed with an outer ring located adjacent the body member wherein said outer ring is spaced from said outer shaft so that said outer shaft tab can be accommodated therebetween; and, an annular lip integral with said outer ring positioned so that, when said outer shaft is extended, said outer shaft tab can be positioned against said lip.

29. The handle assembly of claim 28 wherein said sleeve further defines a channel that extends longitudinally along said outer shaft from said sleeve lip, and said at least one outer shaft tab is normally located in said channel.

30. The handle assembly of claim 27 wherein said sleeve is formed with at least one finger that extends longitudinally along said outer shaft, said outer shaft ring further includes a means for attaching an actuator disarming linkage member thereto and wherein said outer shaft ring is mounted to said outer shaft so as to allow free rotation therebetween and is formed with a notch adapted to be fitted over said sleeve finger so that said ring is restricted from rotating relative to said sleeve.

31. The handle assembly of claim 29 wherein said sleeve is formed with at least one finger that extends longitudinally along said outer shaft from said sleeve lip, wherein said finger defines said sleeve channel, said outer shaft ring further includes a means for attaching an actuator disarming linkage member thereto, and wherein said outer shaft ring is mounted to said outer shaft so as to allow free rotation therebetween and is formed with a notch adapted to be fitted over said sleeve extension so that said ring is restricted from rotating relative to said sleeve.

32. An aircraft door handle assembly for an aircraft door latch mechanism comprising:
an inner shaft having an inboard end and an outboard end distal from said inboard end and rotatably mounted to the aircraft fuselage wherein said inner shaft is connected to the aircraft door latch mechanism for actuating the aircraft door mechanism;
an outer shaft disposed over said inner shaft, said outer shaft having an inboard end and an outboard end distal from said inboard end wherein said outer shaft is rotatably mounted to the aircraft fuselage to telescope away from said inner shaft, is dimensioned to be spaced from said inner shaft, and is formed with at least one opening so as to allow fluid flow between the outside of said outer shaft to the space between said shafts;
an inside handle secured to said inner shaft inboard end for rotating said inner shaft;
an outside handle secured to said outer shaft outboard end for extending and rotating said outer shaft;
a clutch assembly including a first clutch element attached to said inner shaft adjacent said inner shaft outboard end and a second clutch element attached to said outer shaft adjacent said outer shaft inboard end wherein said clutch elements are positioned so that, when said outer shaft overlaps said inner shaft, said clutch elements are spaced apart, and when said outer shaft is extended, said clutch elements interlock so that said shafts rotate in unison; and
a restraining assembly attached to said outer shaft for maintaining said outer shaft over said inner shaft so that said clutch elements are normally spaced apart.

33. The handle assembly of claim 32 wherein said restraining assembly includes a biasing member connected between the aircraft fuselage and said outer shaft for imposing an inwardly directed force on said outer shaft.

34. The handle assembly of claim 32 wherein said outer shaft has a thickness of approximately 50 to 120 mils.

35. The handle assembly of claim 33 wherein said outer shaft has a thickness of approximately 50 to 120 mils.

36. The handle assembly of claim 32 wherein said outer shaft has a thickness of approximately 85 mils.

* * * * *